US012502856B2

(12) United States Patent
Ishihara

(10) Patent No.: US 12,502,856 B2
(45) Date of Patent: Dec. 23, 2025

(54) MOLD FOR FORMING TIRE AND TIRE PRODUCTION METHOD

(71) Applicant: BRIDGESTONE CORPORATION, Tokyo (JP)

(72) Inventor: Yasuyuki Ishihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/694,412

(22) PCT Filed: Jun. 2, 2022

(86) PCT No.: PCT/JP2022/022542
§ 371 (c)(1),
(2) Date: Mar. 22, 2024

(87) PCT Pub. No.: WO2023/079782
PCT Pub. Date: May 11, 2023

(65) Prior Publication Data
US 2024/0391195 A1 Nov. 28, 2024

(30) Foreign Application Priority Data
Nov. 2, 2021 (JP) .................................. 2021-179839

(51) Int. Cl.
B29D 30/06 (2006.01)
(52) U.S. Cl.
CPC .. B29D 30/0629 (2013.01); *B29D 2030/0607* (2013.01); *B29D 2030/0631* (2013.01)

(58) Field of Classification Search
CPC ............ B29D 30/0606; B29D 30/0629; B29D 2030/0607; B29D 2030/063; B29D 2030/0631
(Continued)

(56) References Cited

U.S. PATENT DOCUMENTS 3,704,082 A 11/1972 Hottle
3,854,853 A * 12/1974 Mirtain .............. B29D 30/0629
425/46

(Continued)

FOREIGN PATENT DOCUMENTS

DE 2422406 A1 8/1975
GB 1176162 A 1/1970
(Continued)

OTHER PUBLICATIONS

Ishihara, JP 2018202787, updated machine translation. (Year: 2018).*
(Continued)

*Primary Examiner* — Sedef E Paquette
(74) *Attorney, Agent, or Firm* — KENJA IP LAW PC

(57) ABSTRACT

The provided is a mold for forming a tire and a tire production method that can reduce the driving force required to drive the segment in the initial stage of releasing a tire from the mold. The mold for forming a tire comprises: a circular tread molding portion divided into a plurality of circumferentially aligned segments; and a tilting mechanism that tilts the segments radially outward when the tread molding portion is opened radially outward, and the tilting mechanism reverts the tilt of the segments after the tread molding portion is opened.

11 Claims, 15 Drawing Sheets

(58) Field of Classification Search
USPC ........................................................ 425/28.1
See application file for complete search history.

(56) References Cited

U.S. PATENT DOCUMENTS

| | | | |
|---|---|---|---|
| 3,989,791 A | | 11/1976 | Tippin |
| 4,289,463 A | | 9/1981 | Le Moullac |
| 5,667,812 A | | 9/1997 | Shimizu |
| 6,066,283 A | * | 5/2000 | Nara .................. B29D 30/0629 425/46 |
| 7,572,120 B2 | | 8/2009 | Ouyahia et al. |
| 2008/0152742 A1 | * | 6/2008 | Bachochin ......... B29D 30/0629 425/46 |
| 2022/0134605 A1 | | 5/2022 | Iwamoto et al. |

FOREIGN PATENT DOCUMENTS

| | | |
|---|---|---|
| JP | S50157478 A | 12/1975 |
| JP | H08323755 A | 12/1996 |
| JP | 2000084936 A | 3/2000 |
| JP | 2000326332 A | 11/2000 |
| JP | 2000334740 A | 12/2000 |
| JP | 2006312251 A | 11/2006 |
| JP | 2009149079 A | 7/2009 |
| JP | 2018202787 A | 12/2018 |
| JP | 2020062787 A | 4/2020 |
| WO | 2014087089 A1 | 6/2014 |
| WO | 2020170347 A1 | 8/2020 |

OTHER PUBLICATIONS

Aug. 2, 2022, International Search Report issued in the International Patent Application No. PCT/JP2022/022542.

May 2, 2024, International Preliminary Report on Patentability issued in the International Patent Application No. PCT/JP2022/022542.

Jan. 24, 2025, search result of the Extended European Search Report issued by the European Patent Office in the corresponding European Patent Application No. 22889607.2.

* cited by examiner

MOLD FOR FORMING TIRE AND TIRE PRODUCTION METHOD

TECHNICAL FIELD

The present disclosure relates to a mold for forming a tire and a tire production method.

BACKGROUND

As a conventional mold for forming a tire used in producing a tire by vulcanizing and molding an unvulcanized raw tire, it is known that a circular tread molding portion (tread mold) for forming a tire tread is divided into a plurality of circumferentially aligned segments and it opens and closes due to radial movement of each segment (see, for example, Patent Literature 1 to 3).

CITATION LIST

Patent Literature

PTL 1: JP 2000/326332 A1
PTL 2: JP 2000/334740 A1
PTL 3: JP 2009/149079 A1

SUMMARY

Technical Problem

However, in the above conventional mold for forming a tire or tire production method, when the tire is released from the tread molding portion after vulcanizing and molding, each segment moves radially outward while maintaining its posture with respect to the tire tread, so that the entire tread design surface, which is for molding the tread, of each segment is detached from the tread at the same time. Therefore, a large driving force is required to drive the segments until the segments are detached from the tire.

For example, in the early stages of tire releasing from a mold, the tread design surface of the segment must be detached from the tread, and protrusions of the segment corresponding to the design surface pattern of the tire must be pulled out therefrom. Therefore, when the tread design surface of the segment was detached from the tread, a large driving force was required to release the adhesion between the tread design surface and the tread. In addition, during the period until the segment is detached from the tire, due to the undercut resistance which is generated when the protrusions of the segment corresponding to the design surface pattern of the tire is pulled out therefrom, large driving force was required to drive the segment.

This disclosure has been made in view of these circumstances, and its purpose is to provide a mold for forming a tire and a tire production method that can reduce the driving force required to drive the segment in the initial stage of releasing a tire from the mold.

Solution to Problem

The mold for forming a tire in accordance with the present disclosure to achieve the above-mentioned purpose comprises:
a circular tread molding portion divided into a plurality of circumferentially aligned segments; and
a tilting mechanism that tilts the segments radially outward when the tread molding portion is opened radially outward, and
the tilting mechanism reverts the tilt of the segments after the tread molding portion is opened.

The tire production method in accordance with the present disclosure to achieve the above-mentioned purpose is,
a tire production method using a mold for forming a tire which comprises a circular tread molding portion divided into a plurality of circumferentially aligned segments, including:
a first process of tilting the segment radially outward of the tread molding portion when the tread molding portion is opened after vulcanizing and molding an unvulcanized raw tire; and
a second process of reverting the tilt of the segment after the tread molding portion is opened.

Advantageous Effect

This disclosure can provide a mold for forming a tire and a tire production method that can reduce the driving force required to drive the segment in the initial stage of releasing a tire from a mold.

DETAILED DESCRIPTION

First Embodiment

Figure 1:
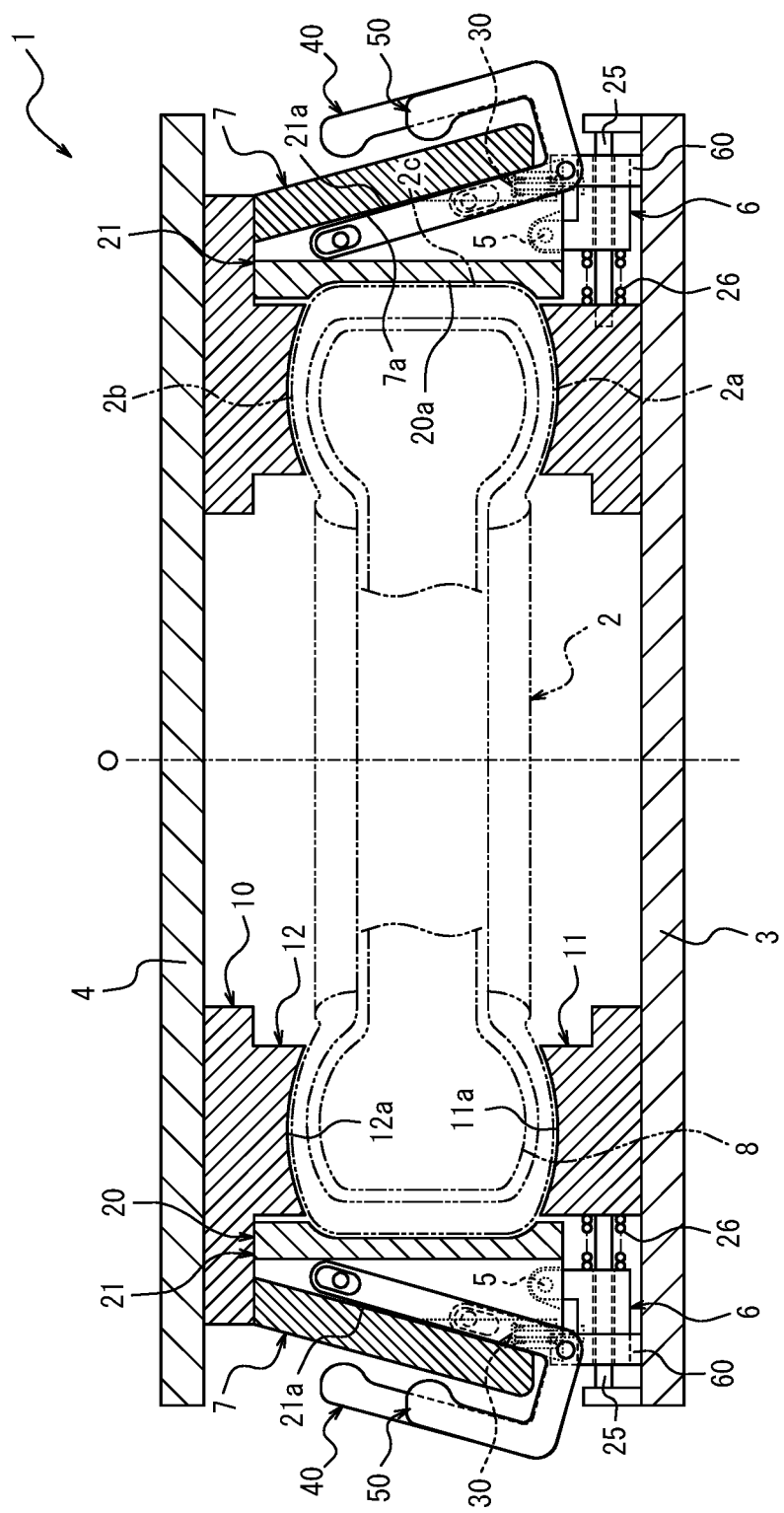
FIG. 1 is a cross-sectional view of a mold for forming a tire according to one embodiment of this disclosure when viewed from the front.

The following is a detailed illustration of a mold for forming a tire and a tire production method, with reference to the drawings. Note that the same reference numerals are given to common members and parts in each figure.

A mold 1 for forming a tire in accordance with one embodiment of the present disclosure, illustrated in FIG. 1, is used to produce a tire 2 by molding a raw tire formed mainly of unvulcanized (pre-vulcanized) synthetic rubber into a predetermined shape while vulcanizing it.

The tire 2 is a hollow tire made mainly of synthetic rubber, having a pair of sidewalls 2a and 2b and a tread 2c, and formed into a shape with an interior space filled with air, nitrogen or other gas.

The mold 1 for forming a tire has a sidewall molding portion 10 and a tread molding portion 20.

The sidewall molding portion 10 can, for example, consist of a circular lower sidewall molding portion 11 fixed to the upper surface of a lower container 3 and a circular upper sidewall molding portion 12 fixed to the lower surface of a upper container 4.

The sidewall molding portion 10 can position (store) the circular tire 2 or a raw tire between the lower sidewall molding portion 11 and the upper sidewall molding portion 12 in an orientation where the center axis of the tire is coaxial with the center axis O of the sidewall molding portion 10.

The lower sidewall molding portion 11 comprises a circular, upward-facing lower sidewall design surface 11a, centered on the central axis O. The lower sidewall design surface 11a can be used to mold the outer surface of one sidewall 2a of the tire 2 or the raw tire (the side facing downward in FIG. 1).

Similarly, the upper sidewall molding portion 12 comprises a circular, downward-facing upper sidewall design surface 12a, centered on the central axis O. The upper sidewall design surface 12a can be used to mold the outer surface of the other sidewall 2b of the tire 2 or the raw tire (the side facing upward in FIG. 1).

The sidewall molding portion 10 is opened by moving the upper container 4 relative to the lower container 3 upward from the position illustrated in FIG. 1 (in the direction where both are separated along the central axis of the tire 2), and the tire 2 is released from the sidewall molding portion 10. Meanwhile, as the upper container 4 moves downward to its original position illustrated in FIG. 1, the sidewall molding portion 10 is closed from its open state to a state where the tire 2 or the raw tire can be molded.

Note, that the configuration of the sidewall molding portion 10 can be changed as needed. For example, the sidewall molding portion 10 is opened by moving the lower container 3 downward relative to the upper container 4.

The tread molding portion 20 is circular and coaxial with the sidewall molding portion 10. The tread molding portion 20 is disposed radially outward of the lower sidewall molding portion 11 and the upper sidewall portion 12 adjacent to them. The inner surface of the tread molding portion 20 facing radially inward is a tread design surface 20a, which molds the outer surface of the tread 2c of the tire 2.

Figure 2:
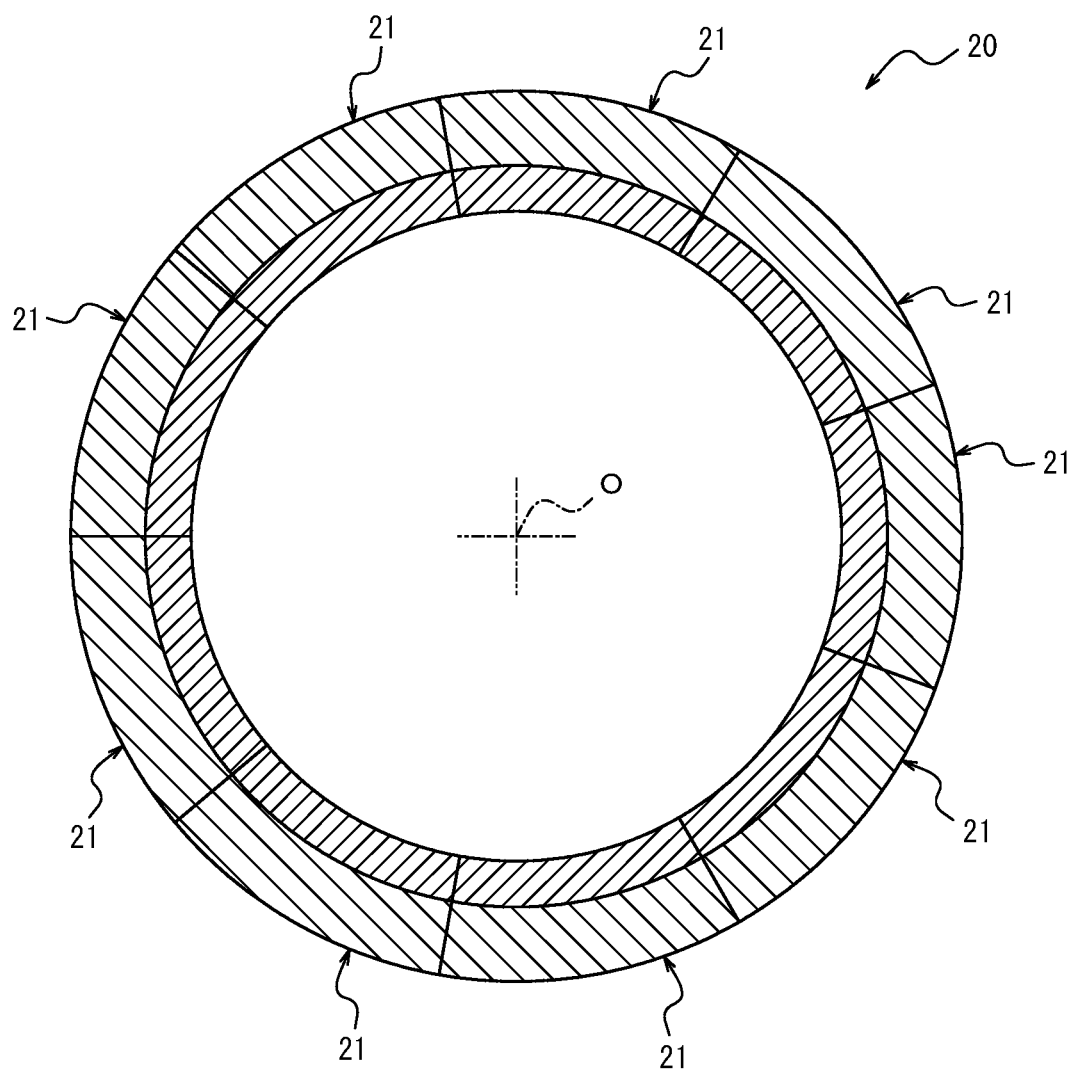
FIG. 2 is a cross-sectional view of a tread molding portion when viewed from the top.

As illustrated in FIG. 2, the tread molding portion 20 is divided into a plurality of circumferentially aligned segments 21. Each of the segments 21 is arc-shaped when viewed from the top. Each of the segments 21 is assembled circumferentially to form the tread molding portion 20, which is a circular mold as a whole. In this embodiment, the tread molding portion 20 consists of nine segments 21 that are identical to each other in circumferential length. Note, that the number of circumferential divisions of the tread molding portion 20 is preferably from 7 to 13, but is not limited to this and can be changed as appropriate.

Figure 3:
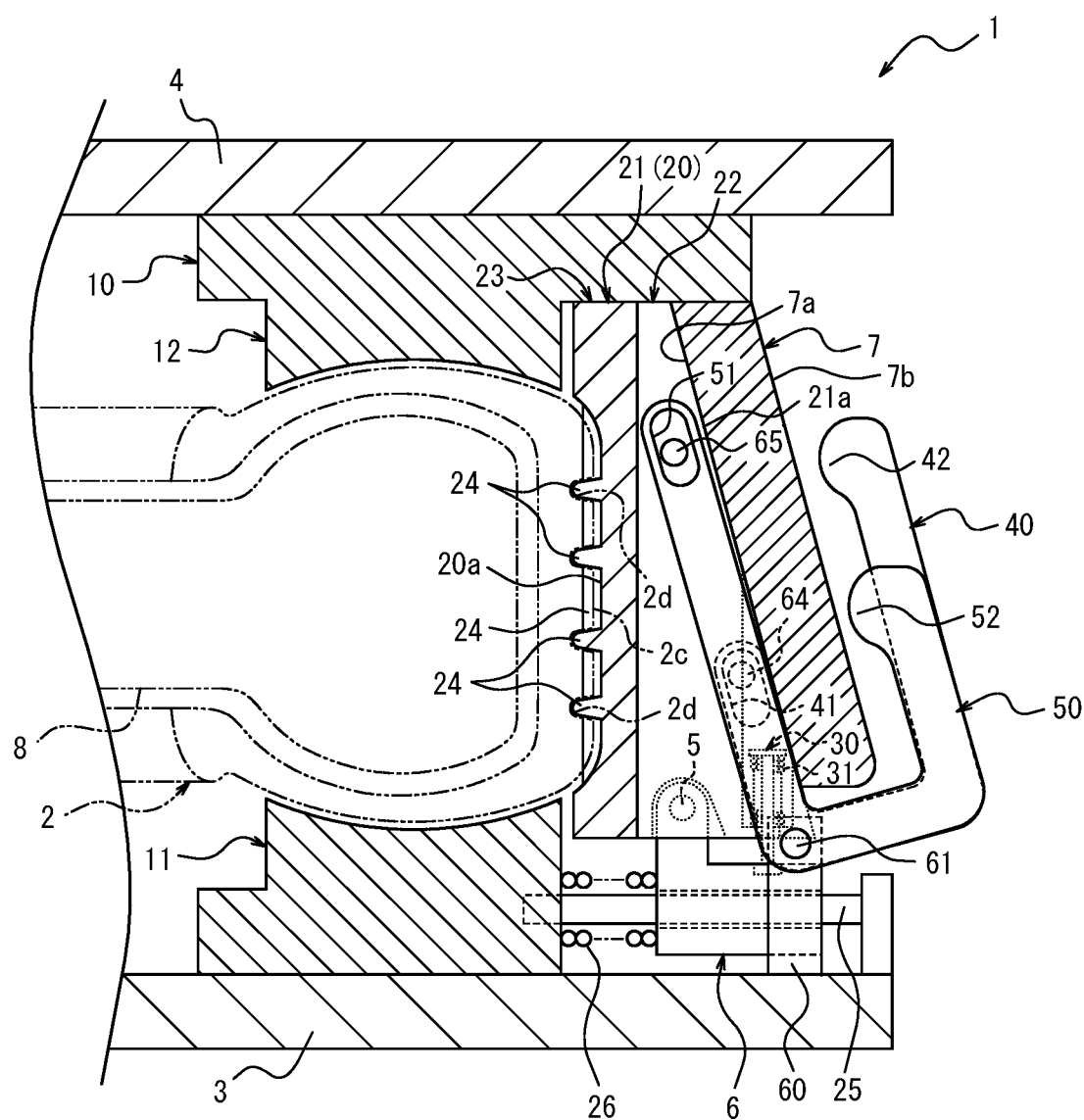
FIG. 3 is an enlarged cross-sectional view when viewed from the front, illustrating a detailed structure of key parts of the mold for forming a tire in the first embodiment.

As illustrated in FIG. 3, in this embodiment, the plurality of segments 21 which constitute the tread molding portion 20 each have a holder 22 and a design surface-divided mold section 23.

The holder 22 can be formed by cutting a block of metal, such as low-carbon steel, for example.

The design surface-divided mold section 23 is the portion that constitutes the tread design surface 20a for molding the tread 2c of the tire 2. It is arc-shaped when viewed from the top, and its radially inner side constitutes a circumferentially divided portion of the tread design surface 20a. The design surface-divided mold section 23 is disposed radially inner side of the corresponding holder 22 and is fixed to the holder 22 using bolts or other fixing members not illustrated in the figure.

The design surface-divided mold section 23 can be configured with a plurality of protrusions 24 protruding radially inner side along the radial direction from the tread design surface 20a. The plurality of protrusions 24 are for forming grooves or sipes, etc., which make up a tread pattern 2d as a pattern of design surface on the tread 2c of the tire 2 during vulcanizing and molding. The plurality of protrusions 24 can be of various shapes or sizes (lengths), such as those extending in the tire width direction or in the tire circumferential direction, corresponding to the tread pattern 2d.

The design surface-divided mold section 23 is preferably formed by casting a metal material with high thermal conductivity, such as an aluminum alloy, for example. In this case, for example, the design surface-divided mold section 23 can be configured by integrating the rib- or blade-shaped protrusions 24 made of steel into the design surface-divided mold section 23 at the time of casting the design surface-divided mold section 23.

As illustrated in FIG. 3, each segment 21 comprises a pivot shaft 5 that is provided at one end side (lower end side in the case illustrated in FIG. 3), in the direction of the center axis of the tread molding portion 20, perpendicular to each of the direction of movement (radial direction) of the segments 21 and the center axis of the tread molding portion 20 at one end. As an example, this embodiment describes a case in which the pivot shaft 5 is provided at the lower end portion of the holder 22. The pivot shaft 5 may be provided in the design surface-divided mold section 23.

Below each segment 21, an individual base member 6 corresponding to the segment 21 is disposed. The base member 6 supports the pivot shaft 5, thereby pivotally supporting the segment 21 about the pivot shaft 5. In other words, the segment 21 is pivotally movable with respect to the base member 6 about the pivot shaft 5.

The tread molding portion 20 can be opened, after vulcanizing the tire 2 with the respective segments 21 in the defined position, by pivotally moving the respective segments 21 radially outward from the defined position about the pivot shaft 5 so that to release the tread 2c from the tread design surface 20a.

Figure 4:
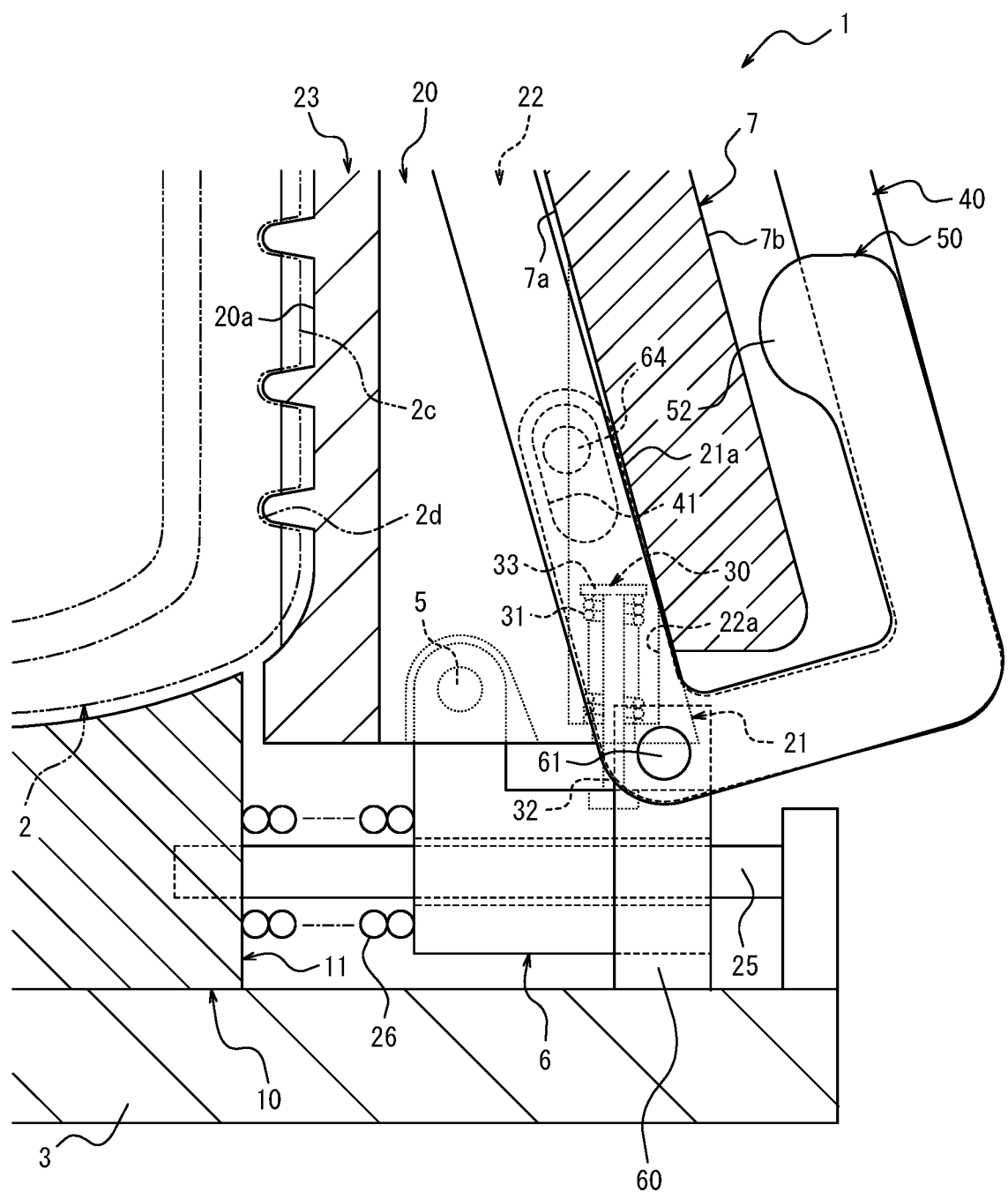
FIG. 4 is an enlarged cross-sectional view when viewed from the front, illustrating a detailed structure of a lower part of one segment in the first embodiment.

In this embodiment, as illustrated in FIG. 4, the mold 1 for forming a tire comprises a guide rail 25 that extends along the radial direction of the segment 21, supported by the lower container 3 and the lower sidewall molding portion 11. The guide rail 25 supports the base member 6 so that the base member 6 is movable in the radial direction of the tread molding portion 20. This allows the base member 6 a radial movement about the enter axis of the tread molding portion 20 (center axis O, see FIGS. 1 and 2).

In addition, as illustrated in FIG. 4, a spring member for sliding 26 is disposed between the base member 6 and the lower sidewall molding portion 11, and that biases the base member 6 radially outward of the tread molding portion 20. Each of the segments 21 is urged radially outward by the corresponding spring member for sliding 26. When the base member 6 moves in the radial direction, the segment 21 supported thereby also moves in the radial direction together with the base member 6.

Between each segment 21 and the base member 6 corresponding to the segment 21, an external force application mechanism 30 is provided, that applies an external force to the segment 21 in a direction to cause the segment 21 pivotally moving about the pivot shaft 5 so that the upper end side of the segment 21 moves radially outward, when the tread molding portion 20 is opened radially outward after vulcanizing and molding of the tire 2.

In this embodiment, the external force application mechanism 30 comprises a spring member for pivotal movement 31 that applies a spring force to the segment 21 as an external force. Note, that the external force application mechanism 30 is not limited to a configuration with the spring member for pivotal movement 31 that applies a spring force to the segment 21 as an external force, but can also be configured to apply an external force to the segment 21 by a drive source such as an air cylinder, for example.

More specifically, as illustrated in FIG. 4, the external force application mechanism 30 comprises a shaft body 32 fixed in a vertical position extending vertically on the top surface of the base member 6. The shaft body 32 is inserted into a hole 22a provided in the holder 22 constituting the segment 21, and a flange 33 at its upper end is disposed in the hole 22a. The spring member for pivotal movement 31 is a compression coil spring and is disposed in a compressed state between the flange 33 and the bottom wall of the hole 22a. This applies an external force to the segment 21 from the external force application mechanism 30 in a direction to cause the segment 21 pivotally moving about the pivot shaft 5 so that the upper end side of the segment 21 moves radially outward.

As illustrated in FIGS. 1, 3, and 4, an outer ring 7 is disposed on the radially outer side of each segment 21 so that to hold the segment 21 in a defined position against the external force applied by the external force application mechanism 30.

The outer ring 7 is disposed on the radially outer side of the segment 21 and is movable between a holding position that holds the segment 21 in the defined position and a release position that allows the segment 21 to tilt radially outward of the tread molding portion 20.

The outer ring 7 is fixed to the upper container 4 via the upper sidewall molding portion 12 and can move with the upper container 4 relative to the segment 21 supported by the lower container 3 or the base member 6 in the vertical direction. Note, that the defined position is the position where the tread design surface 20a provided on the design surface-divided mold section 23 of one segment 21 is in a continuous posture along the circumferential direction with respect to the tread design surface 20a provided on the design surface-divided mold section 23 of the other segments 21.

The outer ring 7 comprises a first inclined surface 7a on its inner circumferential surface facing radially inward, which slopes upward to gradually decrease in outer diameter. Also, the outer ring 7 comprises a second inclined surface 7b on its outer circumferential surface facing radially outward, which slopes upward to gradually decrease in outer diameter. The second inclined surface 7b is a surface along the first inclined surface 7a.

On the other hand, each segment 21 comprises a tapered surface 21a on its outer circumferential surface facing radially outward, that slopes upward to gradually decrease in outer diameter. In this embodiment, the tapered surface 21a is provided on the outer circumference of the holder 22. The tapered surface 21a is an inclined surface roughly along the first inclined surface 7a.

When the outer ring 7 is in the holding position illustrated in FIGS. 1 and 3, the first inclined surface 7a contacts the tapered surface 21a of the segment 21 to hold the segment 21 in the defined position. The outer ring 7 can move along the direction of the center axis with the upper container 4 to the release position, which is located on the upper side than the holding position, when the upper container 4 moves upward and the tread molding portion 20 is opened. Note, that the outer ring 7 can close the tread molding portion 20 by moving along the direction of the center axis of the segment from the release position to the holding position.

Between each segment 21 and the base member 6 and the outer ring 7 corresponding to the segment 21, a tilting mechanism is provided to adjust the tilting state of the segment 1 by pivotally moving the segment 21 radially outward or inward about the pivot shaft 5, when the tread molding portion 20 is opened radially outward after vulcanizing and molding the tire 2. The tilting mechanism tilts the segment 21 radially outward and applies an external force to the segment 21 to revert the tilt of the segment 21.

The tilting mechanism is configured to revert the tilt of the segment 21 after the tread molding portion 20 is opened and before the tread molding portion 20 is completely separated from the tire tread.

Figure 5:
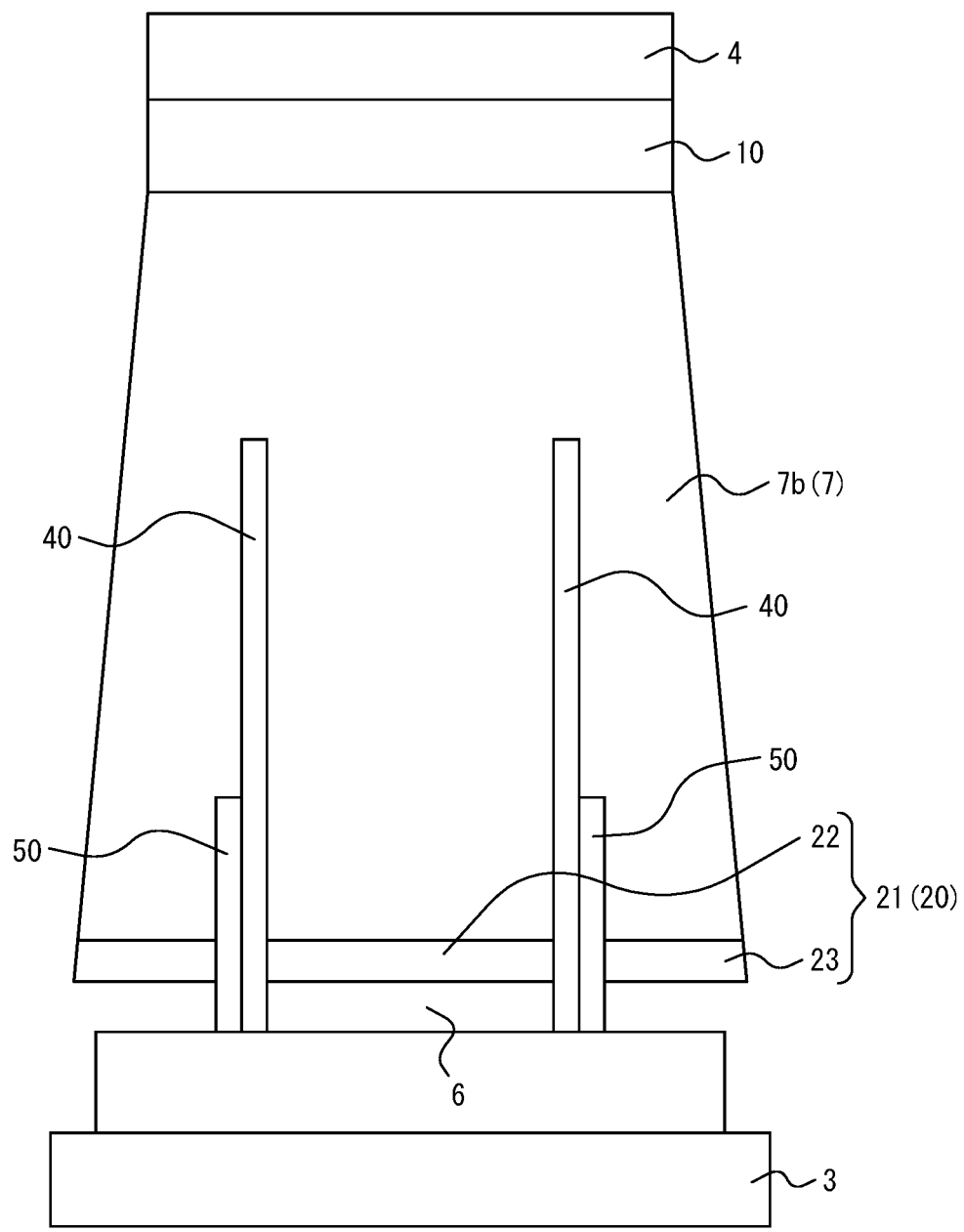
FIG. 5 illustrates one segment in the first embodiment viewed from radially outer side of the tread molding portion.

As illustrated in FIGS. 3 and 5, the tilting mechanism, in addition to the above-mentioned pivot shaft 5 (see FIG. 3) and the base member 6, further includes: a first link 50 as a first tilting mechanism that pivotally moves the segment 21 about the pivot shaft 5, as a center of pivotal movement, to tilt the segment 21 when the tread molding portion is opened; and a second link 40 as a second tilting mechanism that pivotally moves the segment 21 about the pivot shaft 5, as a center of pivotal movement, to revert the tilt of the segment 21 after the tread molding portion is opened (after it has started to open).

The first link 50 is a member with a shape similar to the shape of U, a capital letter of the alphabet, as illustrated in FIG. 3. The first link 50 in this embodiment is longer at one end than at the other end when viewed from the valley portion in the U-shape. The first link 50 is bridged from the segment 21 to the outer ring 7. The first link 50 is connected to one end portion of the segment 21 and is capable of engaging with the second inclined surface 7b. In this embodiment, the first link 50 is connected to the segment 21 at one end thereof by being supported on a support axis 65 extending in the circumferential direction of the tread molding portion 20 at the upper end side of the segment 21 (holder 22, as an example, in this embodiment). In addition, the first link 50 is supported by a support axis 61 of the link support 60 extending from the top surface of the lower container 3 and is capable of engaging with the second inclined surface 7b.

A long hole 51 is formed at one end of the first link 50. The first link 50 is connected to the segment 21 by the support axis 65 inserted through this long hole 51. In addition, the first link 50 is supported by the support axis 61 at the end portion of the segment 21 side in the U-shaped valley portion, and be pivotally movable about the support axis 61 as the pivot center. The first link 50 has its other end disposed radially outer side of the tread molding portion 20 than the second inclined surface 7b and is capable of engaging with the second inclined surface 7b. In this embodiment, the first link 50 has a projection 52 facing the second inclined surface 7b on the tip side (upper end portion) at the other end.

As the outer ring 7 moves from the defined position to the release position, the first link 50 is towed by the second inclined surface 7b to tow the upper end portion of the segment 21 radially outward to tilt the segment 21. In this embodiment, the pivotal movement of the segment 21 radially outward about the pivot shaft 5 moves the upper-end side of the segment 21 radially outward, thereby causing the segment 21 to be tilted. Note, that in the following description, the movement of the outer ring 7 from the defined position to the release position may simply be described as the raising of the outer ring 7, etc.

The second link 40 is a member with a shape similar to the shape of U, a capital letter of the alphabet, as illustrated in FIG. 3. The second link 40 in this embodiment is shorter or approximately the same length at one end than at the other end when viewed from the valley portion in the U-shape. The second link 40 is bridged from the segment 21 to the outer ring 7. The second link 40 is connected to a different end of the segment 21 than the side to which the first link 50 is connected, and is capable of engaging with the second inclined surface 7b. In this embodiment, the second link 40 is connected to the segment 21 by being supported on a support axis 64 extending in the circumferential direction of the tread molding portion 20 at the lower end side of the segment 21 (holder 22, as an example, in this embodiment), that is, below the position where the first link 50 is connected to the segment 21. In addition, the second link 40 is engaged to the support axis 61 of the link support 60 and the second inclined surface 7b.

A long hole 41 is formed at one end of the second link 40. The second link 40 is engaged to the segment 21 by the support axis 64 inserted through this long hole 41. In addition, the second link 40 is supported by the support axis 61 at the end portion of the segment 21 side in the U-shaped valley portion, and is pivotally movable about the support axis 61 as the pivot center. The second link 40 has its other end disposed radially outer side of the tread molding portion 20 than the second inclined surface 7b and is capable of engaging with the second inclined surface 7b. In this embodiment, the second link 40 has a projection 42 facing the second inclined surface 7b on the tip side (upper end portion) at the other end. The projection 42 is disposed above the projection 52 of the first link 50. The projection 42 is disposed farther radially outward from the second inclined surface 7b than the projection 52.

The second link 40 is towed by the second inclined surface 7b as the outer ring 7 rises, thereby towing the tilted segment 21 radially outward to revert the tilt of the segment 21. In this embodiment, the pivotal movement of the segment 21 radially inward about the pivot shaft 5 moves the lower-end side of the segment 21 radially outward, thereby getting up the segment 21. The first link 50 may be disposed circumferentially outer side of the tread molding portion 20 than the second link 40, as illustrated in FIG. 5, as an example. On the radially outer side from the second inclined surface 7b, the upper end of the first link 50 is positioned lower than the upper end of the second link 40.

The mold 1 for forming a tire comprises a bladder 8 that is disposed inside a raw tire and expands when pressurized steam is supplied. In addition, the mold 1 for forming a tire comprises a heater (not illustrated) for heating the sidewall molding portion 10 and the tread molding portion 20. The installation position of the heater can be set as appropriate.

Next, a tire production method for producing the tire 2 of a predetermined shape by vulcanizing and molding a raw tire using the tire mold 1 for forming a tire having the above configuration, i.e., a tire production method, which is an embodiment of the present disclosure will be described.

First, a raw tire is placed inside the mold 1 for forming a tire with the sidewall molding portion 10 and the tread molding portion 20 in the open position, and then the sidewall molding portion 10 and tread molding portion 20 are closed, as illustrated in FIGS. 1 and 3.

When closing the tread molding portion 20, the outer ring 7 contacts the segment 21 with its first inclined surface 7a, which biases the segment 21 radially inward and moves the segment 21 inward in the radial direction. When the tread molding portion 20 is closed, the projection 52 of the first link 50 and the projection 42 of the second link 40 are separated from the second inclined surface 7b (see FIG. 3). The projection 42 is positioned further away from the second inclined surface 7b than the projection 52. In other words, the distance between the projection 42 and the second inclined surface 7b is longer than the distance between the projection 52 and the second inclined surface 7b. Next, pressurized steam is supplied to the bladder 8 disposed inside the raw tire to expand the bladder 8, which presses both sidewalls of the raw tire against the lower sidewall design surface 11a or the upper sidewall design surface 12a of the sidewall molding portion 10, respectively, and also presses the tread against the tread design surface 20a of the tread molding portion 2. In this state, the sidewall molding portion 10 and the tread molding portion 20 are heated by a heater, and the synthetic rubber that constitutes the raw tire is vulcanized by the heat to form a tire 2 of a predetermined shape.

After the molding of the tire 2 is completed, the sidewall molding portion 10 and the tread molding portion 20 are opened and the molded tire 2 is removed.

Figure 6:
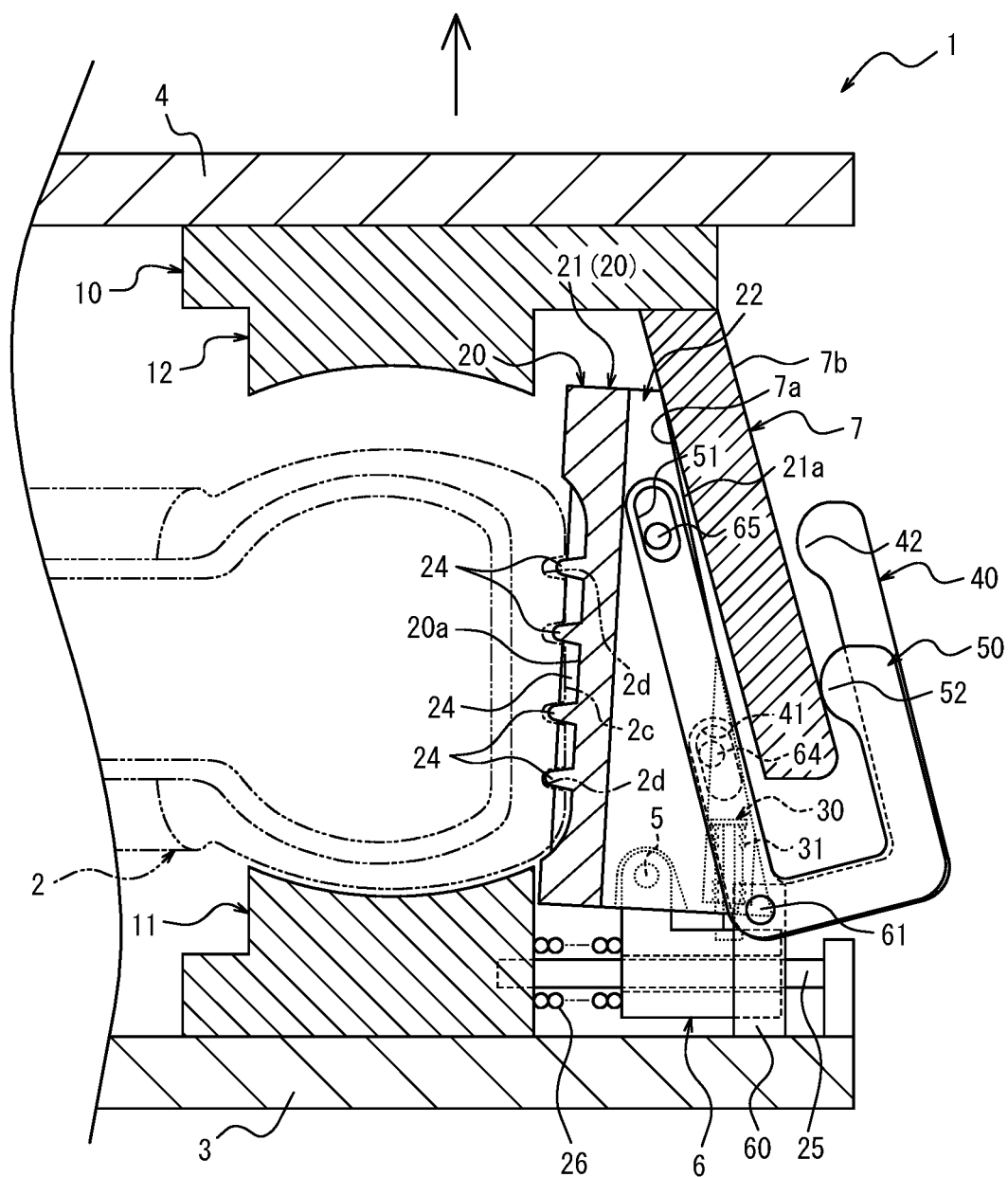
FIG. 6 is a cross-sectional view when viewed from the front, illustrating the state of key parts of the mold for forming a tire in the first embodiment at the initial stage of releasing a tire from the mold.

Here, after vulcanizing and molding the tire 2, as the outer ring 7 moves upward (rises) from the holding position to the release position with respect to each segment 21 and the tread molding portion 20 is started opened, as illustrated in FIG. 6, a first process in which the segment 21 is tilted radially outward of the tread molding portion 20 is performed. In this process, the projection 52 of the first link 50 contacts the second inclined surface 7b as the outer ring 7 rises, and the first link 50 is engaged to the second inclined surface 7b. When the outer ring 7 rises further after the projection 52 contacts the second inclined surface 7b, with the projection 52 is in contact with the second inclined surface 7b, the projection 52 is towed radially outward while sliding downward and radially outward relative to the second inclined surface 7b. This causes the first link 50 to tow the segment 21 and tilt the segment 21 radially outward. In this state, the tread design surface 20a of the design surface-divided mold section 23 is inclined with respect to the tread 2c of the tire 2.

Due to the inclination of the segment 21 described above, one end in the width direction of tire 2 (upper end side in FIG. 6) of the tread design surface 20a in the design surface-divided mold section 23 is gradually detached from the tread 2c of the tire 2 before the other end (lower end side in FIG. 6). This allows outside air to be gradually introduced between the tread 2c and the tread design surface 20a from that one end side, thereby reducing the release resistance from the tread design surface 20a of the tread 2c of the tire 2.

Note, that when the projection 52 is in contact with the second inclined surface 7b, the projection 42 of the second link 40 may remain separated from the second inclined surface 7b.

Figure 7:
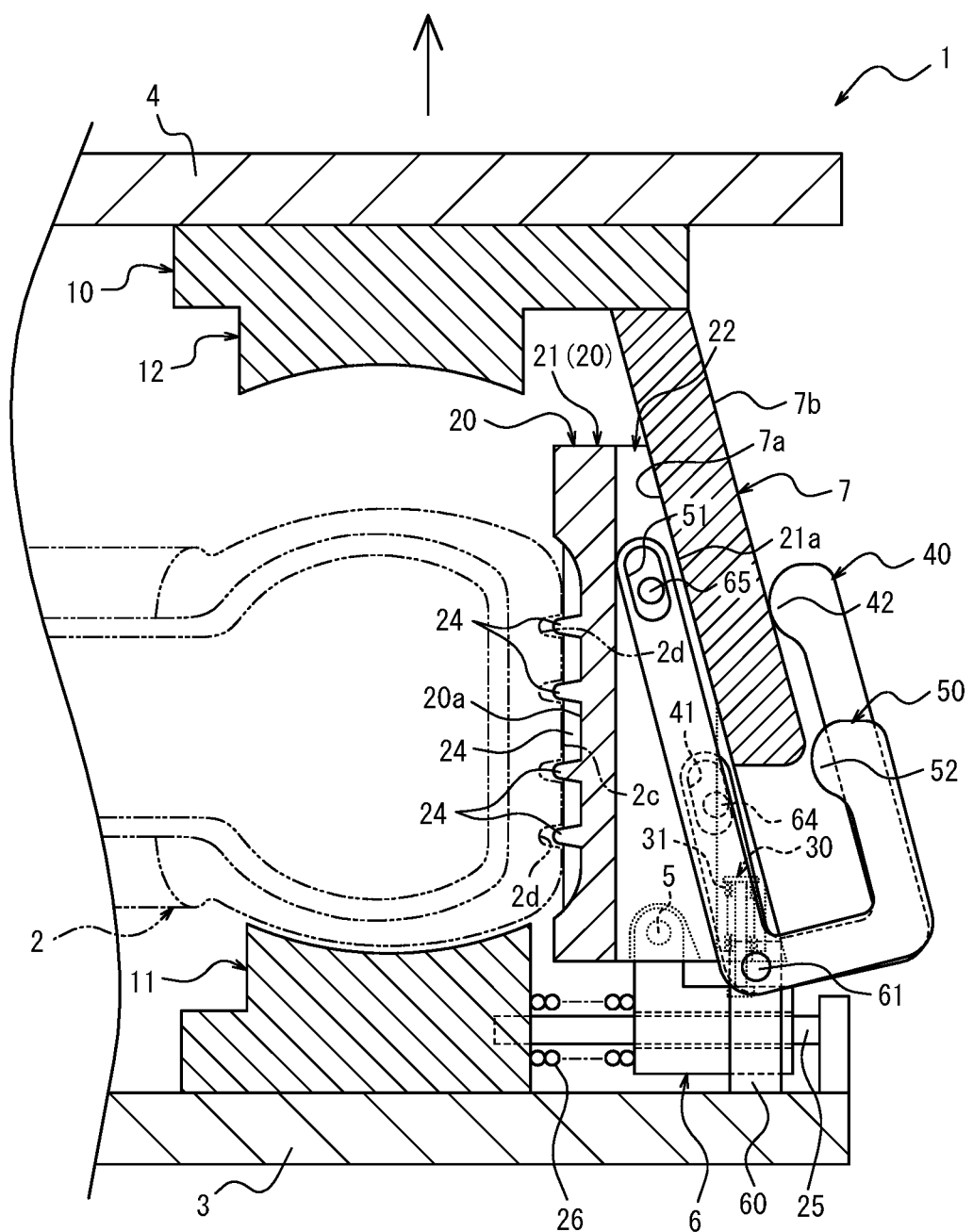
FIG. 7 is a cross-sectional view when viewed from the front, illustrating the state of the key parts of the mold for forming a tire when the tire releasing is further advanced from the state illustrated in FIG. 6.

Furthermore, after the tread molding portion 20 is opened (after a portion of the tread design surface 20a in the design surface-divided mold section 23 is detached), a second process (see the operation from FIG. 6 to FIG. 7) is performed to revert the tilt of the segment 21. The second process should be performed when a portion of the tread design surface 20a in the design surface-divided mold section 23 has been detached, but the protrusions 24 are not fully detached from the tread pattern 2d, i.e., before the tread design surface 20a in the segment 21 is completely separated from the tread 2c of tire 2. In this process, as illustrated in FIG. 7, the projection 52 slips off from the second inclined surface 7b as the outer ring 7 rises, the first link 50 is released from its engagement to the second inclined surface 7b, and the projection 42 of the second link 40 contacts the second inclined surface 7b, and the second link 40 is engaged to the second inclined surface 7b. In other words, after the first link 50 tows the upper end of the segment 21 radially outward, the second link 40 can tow the lower end of the segment 21 radially outward. The details are as follows. As illustrated in FIG. 6, when the outer ring 7 rises further after the projection 42 contacts the second inclined surface 7b, with the projection 42 is in contact with the second inclined surface 7b, the projection 42 is towed radially outward while sliding downward and radially outward relative to the second inclined surface 7b. This causes the second link 40 to tow the lower end of the segment 21 and promptly revert the tilt of the segment 21. In other words, the second link 40 tows the lower part of the segment 21, thereby causing the segment 21 to pivotally move radially inward, but the segment 21 to be got up while moving radially outward as a whole. With the second link 40 towing the segment 21, the tread design surface 20a of the design surface-divided mold section 23 is along (parallel to in this embodiment) the tread 2c of the tire 2. When the tread design surface 20a of the design surface-divided mold section 23 is along the tread 2c of the tire 2, for example, the protrusions 24 are aligned with the grooves, etc. of the tread pattern 2d, i.e., any of the protrusions 24 can be pulled straight out of the tread pattern 2d. This reduces the undercut resistance brought by the protrusions 24 against the tread 2c of the tire 2. In other words, the tire release resistance from the tread design surface 20a that is brought on the tread 2c of the tire 2 can be reduced.

Figure 8:
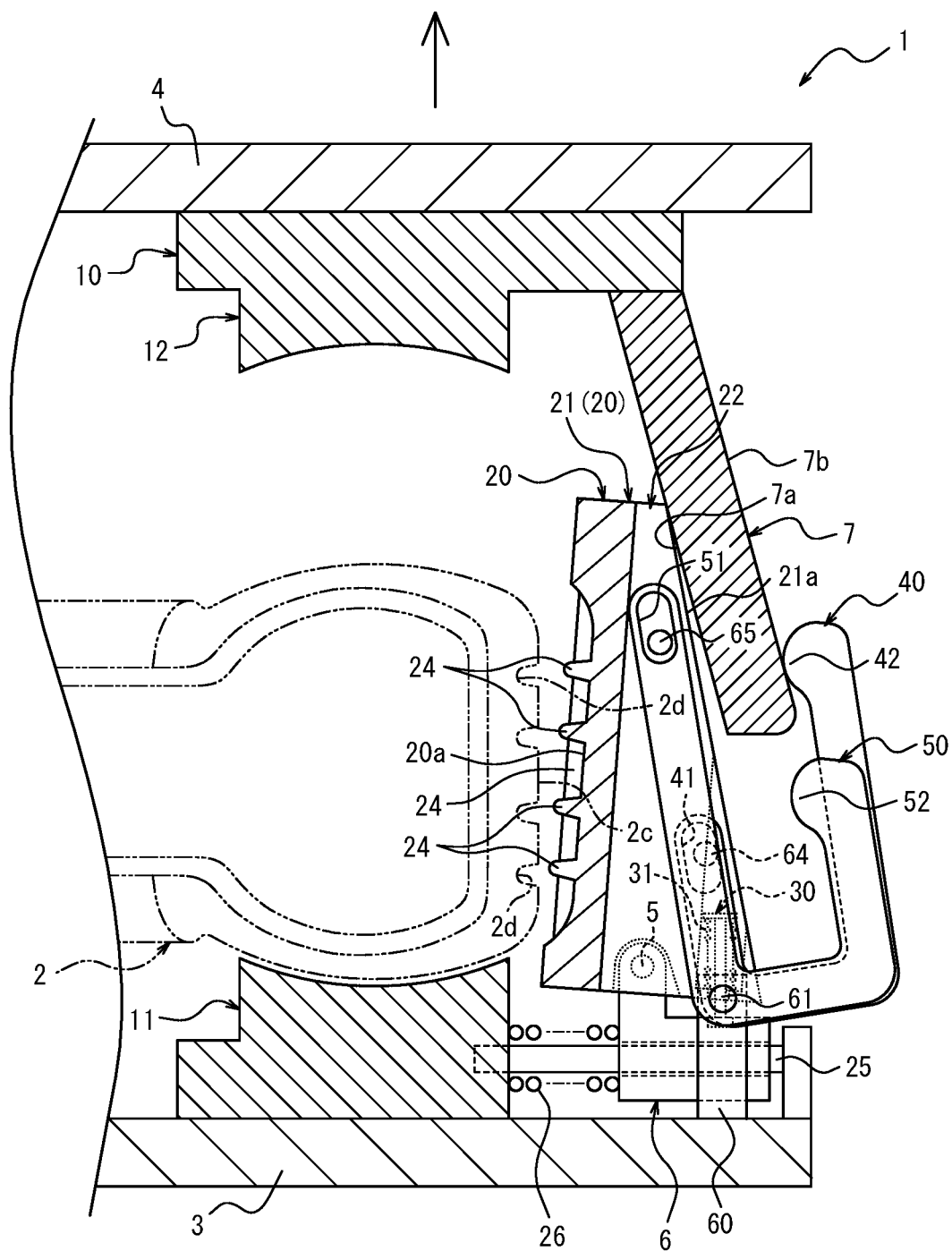
FIG. 8 is a cross-sectional view when viewed from the front, illustrating the state of the key parts of the mold for forming a tire when the tire releasing has been completed.

As illustrated in FIG. 7, after the tile of the segment 21 is reverted, the tread molding portion 20 opens as the outer ring 7 is further raised, and the segment 21 moves radially outward (see the movement from FIG. 7 to FIG. 8), thereby completing the detachment of the tread design surface 20a in the design surface-divided mold section 23 (see FIG. 8). With further raising of the outer ring 7, the projection 42 also slides off from the second inclined surface 7b, the engagement of the second link 40 to the second inclined surface 7b is also released, and the tread molding portion 20 then fully opens as described below (see FIG. 9).

Figure 9:
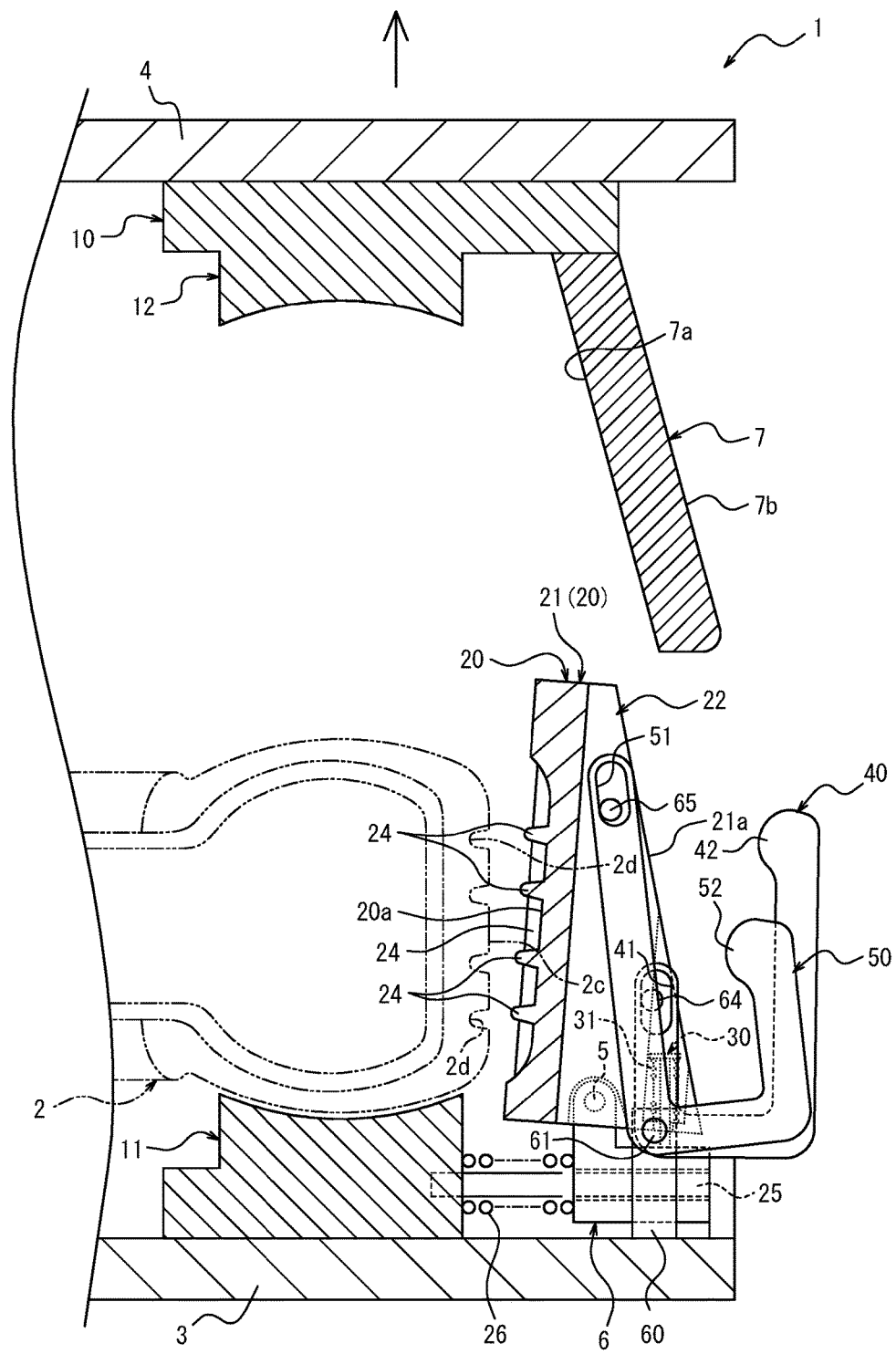
FIG. 9 is a cross-sectional view when viewed from the front, illustrating the state of the key parts of the mold for forming a tire when the tread molding portion is fully open.

As illustrated in FIG. 9, after the second link 40 is released from its engagement to the second inclined surface 7b, the segment 21 is driven by the external force applied by the external force application mechanism 30 and spontaneously pivotally moves radially outward about the pivot shaft 5.

As described above, the mold 1 for forming a tire in this embodiment has a guide rail 25 that supports the base member 6 freely movable in the radial direction of the tread molding portion 20 and a spring member for sliding 26 that biases the base member 6 radially outward of the tread molding portion 20, as illustrated in FIG. 4. As illustrated in FIG. 9, when the outer ring 7 is further raised to the release position after the second link 40 is released from its engagement to the second inclined surface 7b, the segment 21 spontaneously pivotally moves radially outward from the defined position about the pivot shaft 5 by the external force applied by the external force application mechanism 30, and at the same time, the segment 21 is energized by the spring member for sliding 26 and moves radially outward along the guide rail 25 together with the base member 6. As a result, the tread molding portion 20 is completely opened.

In this way, in the tire production method using the mold 1 for forming a tire of this embodiment, when the tread molding portion 20 is opened after vulcanizing and molding the tire 2, the segment 21 is tilted in the radial direction (radially outward in the example of this embodiment) by the tilting mechanism (see FIG. 6), so that at the beginning of the release of the tire 2 from the mold, the force required to release the tread 2c of the tire 2 from the tread design surface 20a can be reduced. In addition, the driving force applied to the segment 21 can be reduced, which reduces the energy required for production and thus lowers production costs. Furthermore, since the mold release resistance of the tread 2c of the tire 2 from the tread design surface 20a can be reduced, residual strain (permanent deformation) in the tire 2 after releasing from the mold can be prevented and the initial performance of the tire 2 can be improved.

After a portion of the tread design surface 20a in the design surface-divided mold section 23 is detached, the segment 21 is got up by the tilting mechanism to bring the tread design surface 20a in the design surface-divided mold section 23 to being along the tread 2c of the tire 2 (see FIG. 7), so that to reduce the undercut resistance brought by the protrusions 24 against the tread 2c of the tire 2, thereby reducing the driving force required to drive the segment 21 during releasing the tire 2 from the mold. Furthermore, when releasing the tire 2 from the tread molding portion 20, the excessive undercut resistance can be prevented, so that to control the defects such as permanent deformation of the tread 2c of the tire 2 after molding or the damage to the protrusions 24, etc.

Note, that the mold 1 for forming a tire of this embodiment is configured, as described above, such that when the outer ring 7 is moved (raised) to the release position, as illustrated in FIG. 9, the segment 21 spontaneously pivotally moves radially outward from the defined position about the pivot shaft 5 by the external force applied by the external force application mechanism 30, and at the same time, segment 21 is energized by the spring member for sliding 26 and moves radially outward along the guide rail 25 together with the base member 6. This allows the segment 21 to reduce the undercut resistance brought by the protrusions 24 against the tread 2c of the tire 2 when the segment 21 pivotally moves about the pivot shaft 5, for example, when the height of the protrusion 24 on the tread design surface 20a is high, such as when molding large tires used for construction vehicles, etc. In addition, the segment 21 can be moved to a position where the protrusions 24 are not in the way when releasing the tire 2 so that the tire 2 can be released more easily.

Furthermore, since the mold 1 for forming a tire of this embodiment is configured with the outer ring 7 which is disposed on the radially outer side of the segment 21 and is movable between the holding position that holds the segment 21 in a defined position and the release position that allows the segment 21 to move pivotally about the pivot shaft 5, the opening and closing mechanism of the segment 21 can be simplified to further reduce the production cost of the tire 2.

The mold 1 for forming a tire of this embodiment can be configured so that when the tread molding portion 20 is opened after vulcanizing and molding the tire 2, one segment (first segment) 21 of the plurality of segments 21 pivotally moves (tilts) radially outward about the pivot shaft 5 (first pivot shaft) as a center, and then the other segment (second segment) 21 pivotally moves (tilts) radially outwards about the pivot shaft 5 (second pivot shaft) as a center. In other words, instead of requiring all segments 21 to be tilted at the same time, a plurality of segments 21 can be configured to pivotally move in sequence, with a time difference between each segment 21. This reduces the maximum driving force required to drive the segments. In this case, the segments 21 can be configured to pivotally move radially outward about the pivot shaft 5 as a center, in turn along the circumferential direction, so that after one segment 21 pivotally moves radially outward about the pivot shaft 5 as a center, the segment 21 adjacent to that segment 21 pivotally moves radially outward about the pivot shaft 5 as a center, and then the segment 21 adjacent to that segment 21 pivotally moves radially outward about the pivot shaft 5 as a center, and so on. This configuration allows the tread 2c of the tire 2 to be released from the tread design surface 20a with a smaller driving force by causing the tread 2c of the tire 2 to be released in circumferential order from a portion of the tread design surface 20c in the initial stage of releasing the tire 2 from the mold.

Variation of First Embodiment

Figure 10:
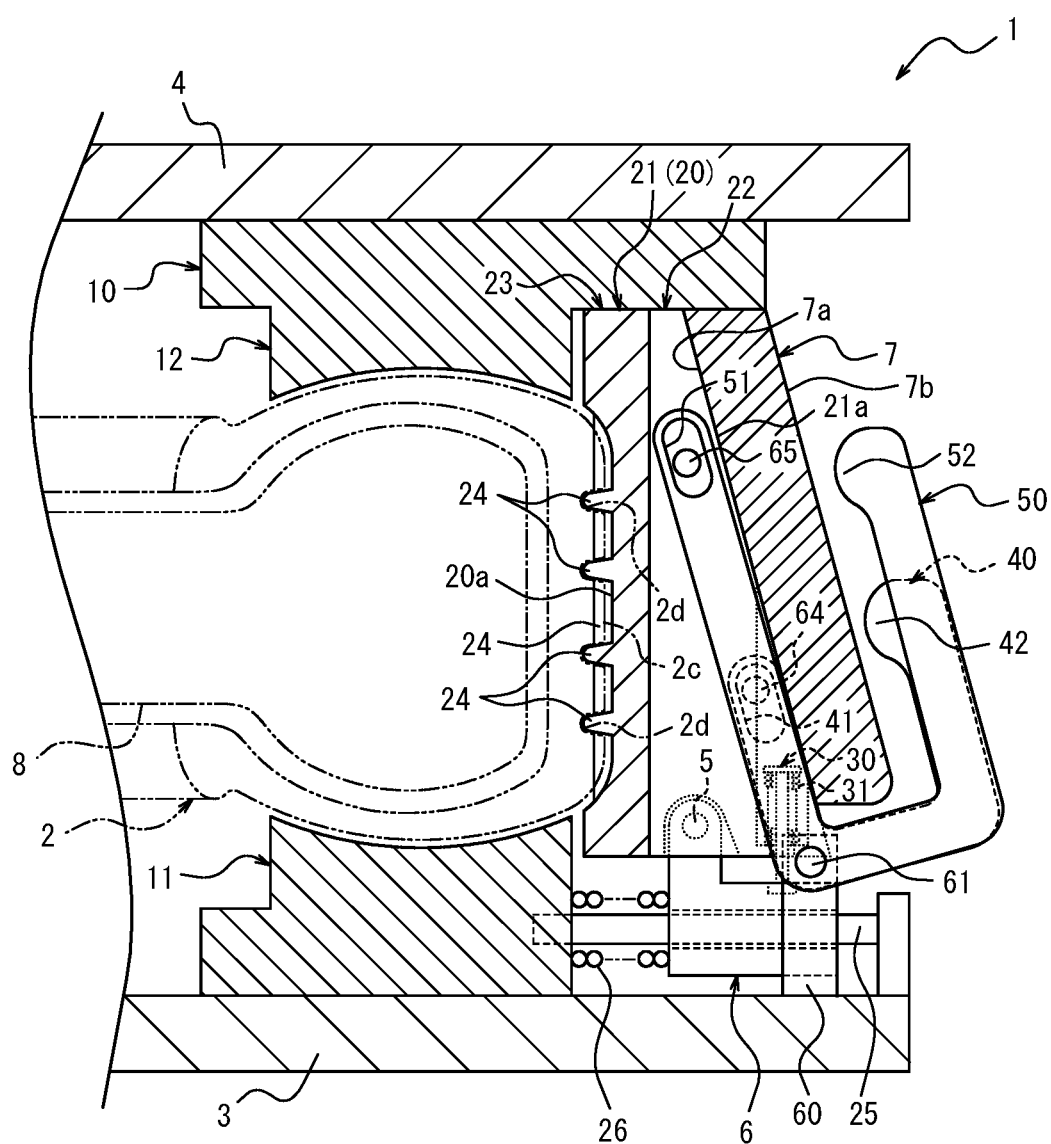
FIG. 10 is an enlarged cross-sectional view when viewed from the front, illustrating a detailed structure of key parts of the mold for forming a tire in a variation of the first embodiment.

The above embodiment describes a case in which the projection 42 is disposed above the projection 52 of the first link 50, and the projection 42 is disposed further away from the second inclined surface 7b than the projection 52. However, as illustrated in FIG. 10, the projection 42 can be disposed below the projection 52 of the first link 50 and the projection 52 can be disposed further away from the second inclined surface portion 7b than the projection 42. In this case, after the second link 40 tows the lower end of the segment 21 radially outward, the first link 50 can tow the upper end of the segment 21 radially outward. This allows the segment 21 to be tilted radially inward by the second link 40 when the tread molding portion 20 is opened after vulcanizing and molding the tire 2, and also allows the segment 21 to be got up by the first link 50 after a portion of the tread design surface 20a in the design surface-divided mold section 23 has been released to bring the tread design surface 20a of the design surface-divided mold section 23 to being along the tread 2c of the tire 2, thereby reducing the driving force required to drive the segment 21 at the beginning of and during releasing the tire 2 from the mold.

Second Embodiment

Figure 11:
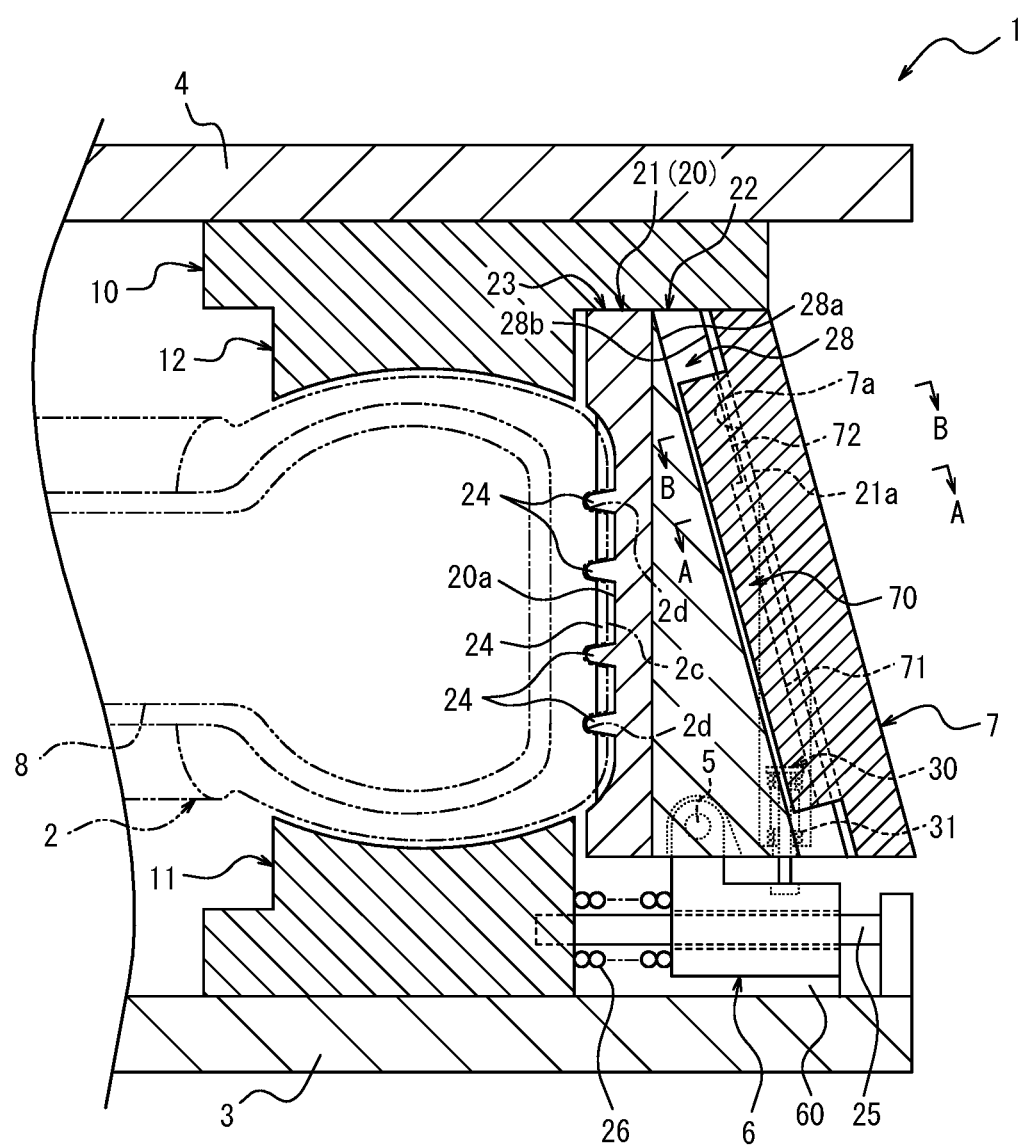
FIG. 11 is an enlarged cross-sectional view when viewed from the front, illustrating a detailed structure of key parts of the mold for forming a tire in the second embodiment.

The first embodiment describes a case in which the mold 1 for forming a tire has a first tilting mechanism and a second tilting mechanism as a tilting mechanism, and the first tilting mechanism being a first link 50 and the second tilting mechanism being a second link 40. Unlike the first embodiment, the second embodiment includes, instead of the first link 50 and the second link 40, an engagement groove 28 formed in a tapered surface 21a of the segment 21 and a rail 70 formed in the first inclined surface 7a of the outer ring 7 as a tilting mechanism, as illustrated in FIG. 11. The following description will focus on the parts that differ from the first embodiment, and redundant explanations will be omitted where appropriate.

The engagement groove 28 is formed as a groove extending along the vertical and radial directions in the tapered surface 21a. The rail 70 is formed as a rail-like member extending along the vertical and radial directions in the first inclined surface 7a. The engagement groove 28 and the rail 70 are of any shape as long as: the rail 70 can be engaged by, for example, fitting into the engagement groove 28; and the rail 70 can be pulled out by towing the segment 21 radially outward through the engagement groove 28 in an engaged state; and the combination is capable of sliding along the extending direction of the engagement groove 28 in the engaged state.

Figure 12:
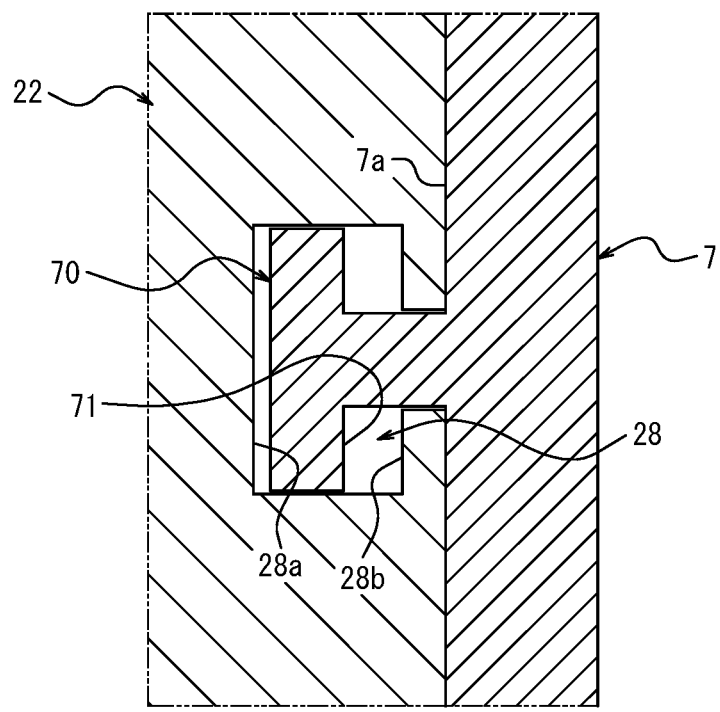
FIG. 12 is a cross-sectional view along A-A in FIG. 11.
Figure 13:
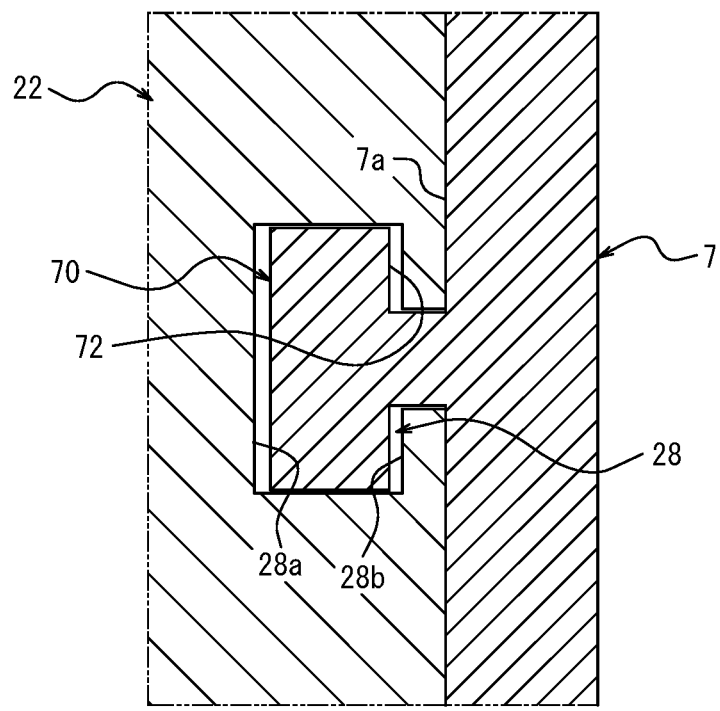
FIG. 13 is a cross-sectional view along B-B in FIG. 11.

In this embodiment, the engagement groove 28 has a shape in which the bottom of the groove expands circumferentially back and forth, as illustrated in FIGS. 12 and 13, as an example. The engagement groove 28 is T-shaped, a capital letter T of the alphabet, in a cross-section when viewed along the extending direction of the engagement groove 28, for example. In FIGS. 11 through 13, of the inner surfaces of the groove, the radially inner surface is indicated as an inner surface 28a, and the radially outer surface is indicated as an outer surface 28b.

The rail 70, in this embodiment, extends from the first inclined surface 7a and further has a tip portion protruding back and forth in the circumferential direction. The rail 70 is T-shaped, a capital letter T of the alphabet, in a cross-section when viewed along the extending direction of the rail 70, for example. The rail 70, when fitted into the engagement groove 28, has a horizontal bar portion at the tip of T-shape that engages with the engagement groove 28.

As illustrated in FIG. 11, the radial outer surface of the rail 70 is generally flat 71 (see FIG. 12), and the upper end of the rail 70 has a convex part 72 that projects radially outward (see FIG. 13). The convex part 72 is formed at a predetermined range along the extending direction of the rail 70 at the upper end of the rail 70. The portion of the rail 70 below the convex part 72 is a flat part 71.

As illustrated in FIG. 11, with the sidewall molding portion 10 and the tread molding portion 20 closed, the outer ring 7 has its first inclined surface 7a in contact with the segment 21. When the tread molding portion 20 is closed, the outer ring 7 has its first inclined surface 7a in contact with the segment 21, which biases the segment 21 radially inward and moves the segment 21 radially inward.

With the sidewall molding portion 10 and the tread molding portion 20 closed, the rail 70 is in contact with or separated from the inner surface 28a of the engagement groove 28 and separated from the outer surface 28b (see FIGS. 12 and 13).

Figure 14:
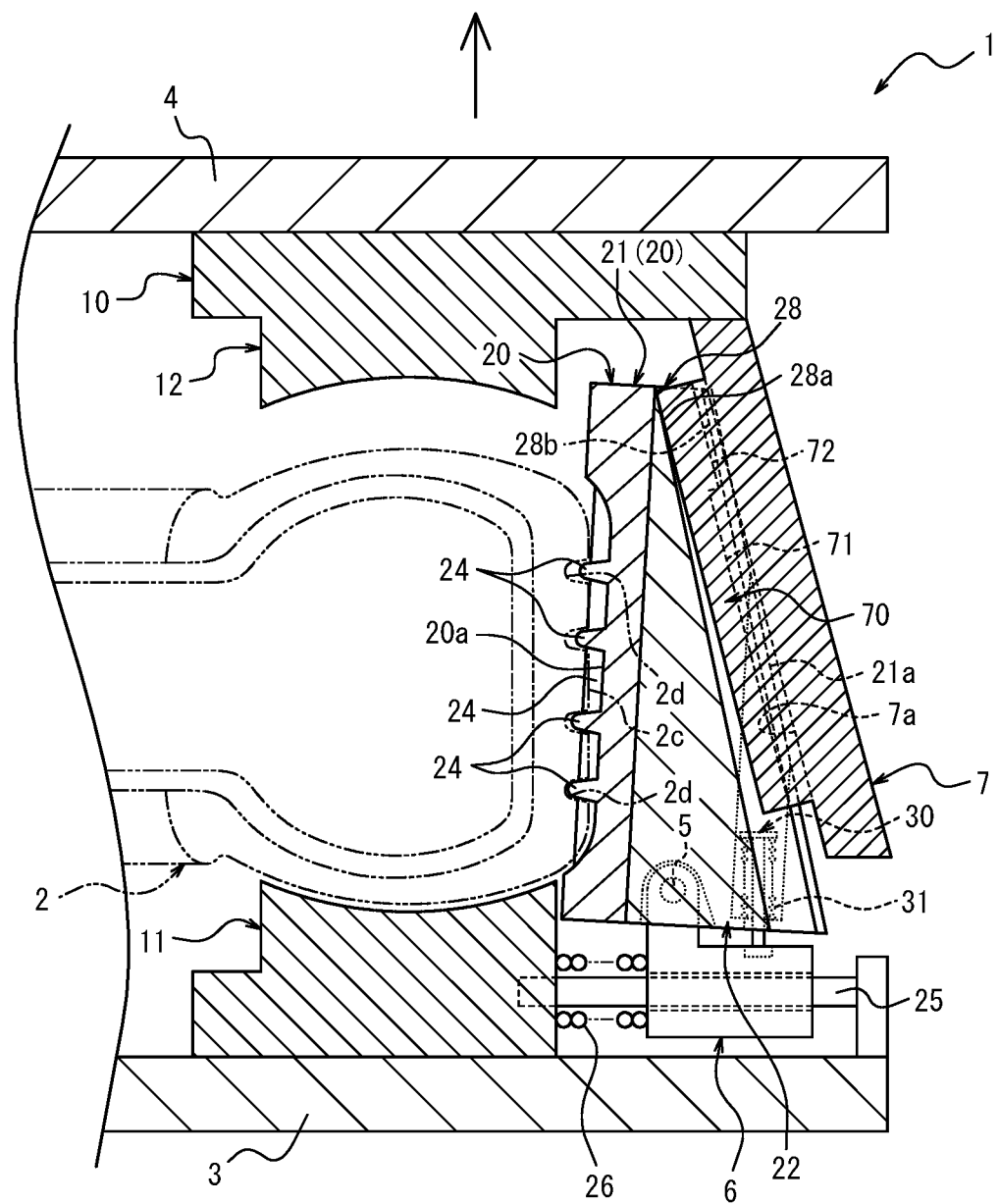
FIG. 14 is a cross-sectional view when viewed from the front, illustrating the state of key parts of the mold for forming a tire in the second embodiment at the initial stage of releasing a tire from the mold.

As illustrated in FIG. 14, in order to open the tread molding portion 20, as the outer ring 7 is raised to open the tread molding portion 20, a first process is performed to tilt the segment 21 radially outward of the tread molding portion 20. In this process, the raising of the outer ring 7 causes the convex part 72 to contact the outer side 28b, and the convex part 72 biases the upper end of the segment 21 radially outward through the outer side 28b, thereby causing the segment 21 to pivotally move and tilt. This causes the tread 2c of the tire 2 to be gradually released, with one-end side of the tread design surface 20a in the width direction of the tire 2 (the upper-end side in FIG. 14) released before the other-end side (the lower-end side in FIG. 14). Note, that when the convex part 72 is in contact with the outer surface 28b, the flat part 71 is separated from the outer surface 28b, or only the lower edge portion of the flat part 71 is in contact with the outer surface 28b.

Figure 15:
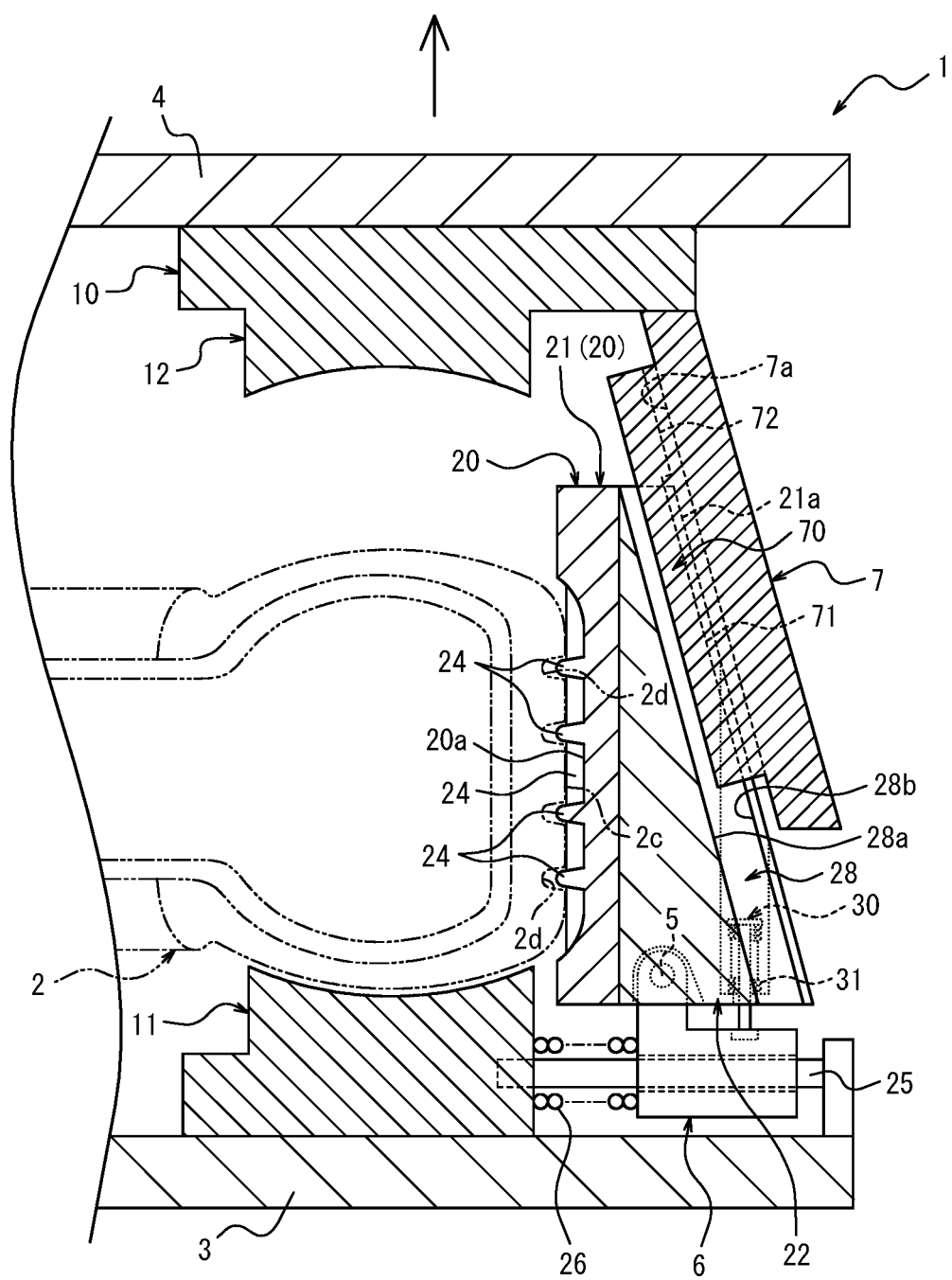
FIG. 15 is a cross-sectional view when viewed from the front, illustrating the state of the key parts of the mold for forming a tire when the tire releasing is further advanced from the state illustrated in FIG. 14.

Furthermore, after the tread molding portion 20 is opened (after a portion of the tread design surface 20a is detached), a second process is performed to revert the tilt of the segment 21 (see the operation from FIG. 14 to FIG. 15). The second process should be performed before the tread design surface 20a in the segment 21 has completely been separated from the tread 2c of the tire 2. In this process, as illustrated in FIG. 15, the raising of the outer ring 7 causes the convex part 72 to exit the engagement groove 28, thereby leaving the flat part 71 in broad contact with the outer surface 28b of the engagement groove 28. This biases the segment 21 radially outward and pivotally moves the segment 21 so that the segment get to being along the flat part 71, thereby reverting the tilt of the segment 21 so that the tread design surface 20a is along (parallel in this embodiment) the tread 2c of tire 2.

Figure 16:
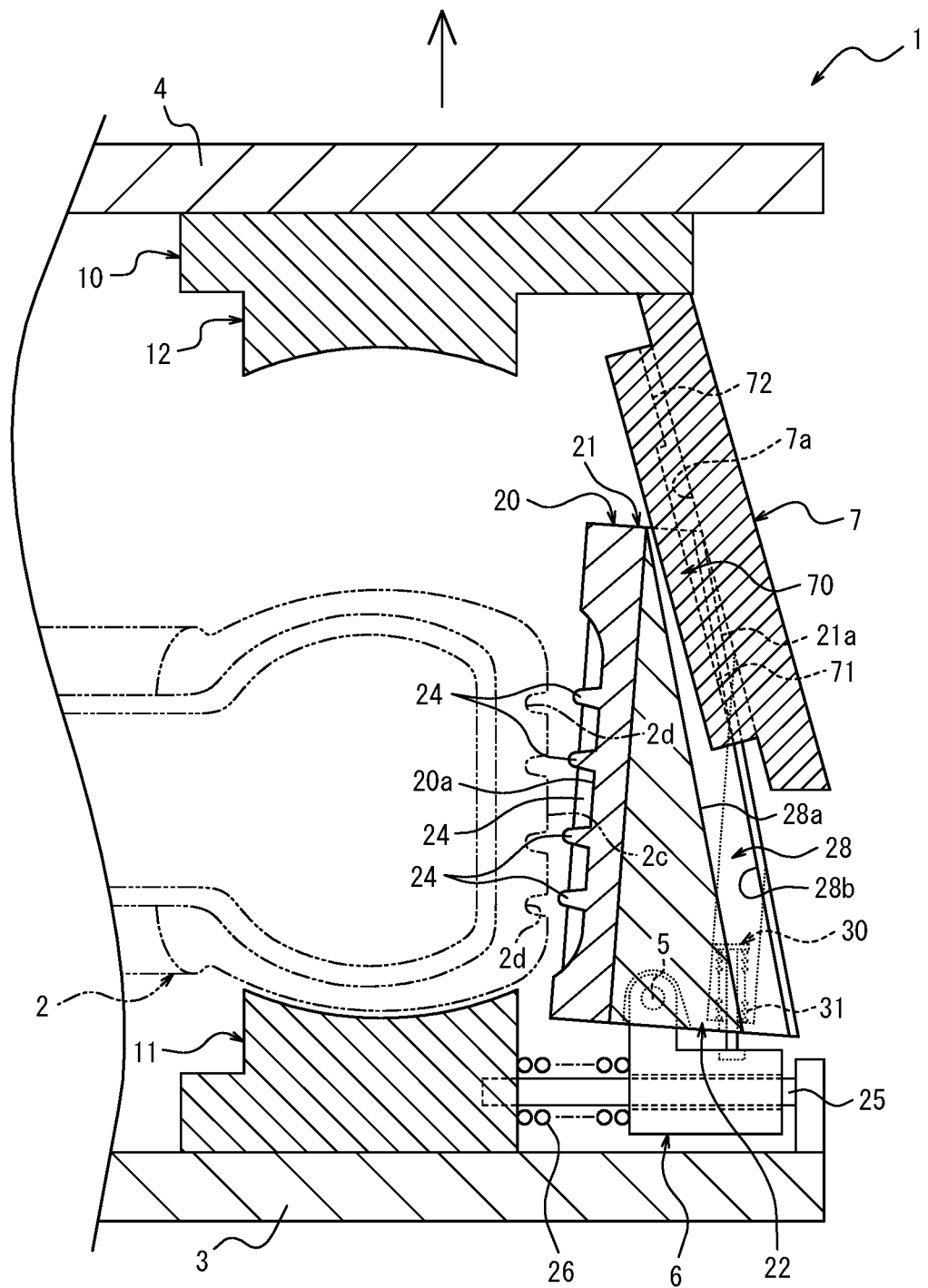
FIG. 16 is a cross-sectional view when viewed from the front, illustrating the state of the key parts of the mold for forming a tire when the tire releasing has been completed.

After reverting the tilt of the segment 21 (see FIG. 15), the tread molding portion 20 opens as the outer ring 7 is further raised, and the segment 21 moves radially outward (see the movement from FIG. 15 to FIG. 16) to complete the detaching of the tread design surface 20a (see FIG. 16). As the outer ring 7 rises, the upper end of the segment 21 may slope radially outward when only the lower end of the flat part 71 is in contact with the upper end in the outer surface 28b of the engagement groove 28.

When the rail part 70 is completely out of the engagement groove 28 and the outer ring 7 is further raised to the release position, the segment 21 spontaneously pivotally moves radially outward about the pivot shaft 5 from the defined position by the external force applied by the external force application mechanism 30. At the same time, the segment 21 is energized by the spring member for sliding 26 and moves radially outward along the guide rail 25 together with the base member 6. As a result, the tread molding portion 20 is completely opened.

When the tilting mechanism is composed of the engagement groove 28 and the rail 70, as in this embodiment, there is no need to use movable parts, e.g. the first link 50 and the second link 40 in the first embodiment, as the tilting mechanism and the structure is simplified, thereby enabling cost reduction.

It goes without saying that the present disclosure is not limited to the aforementioned embodiments and can be modified in various ways without departing from the gist thereof.

REFERENCE SIGNS LIST

1 Mold for forming a tire
10 Sidewall molding portion
11 Lower sidewall molding portion
11a Lower sidewall design surface
12 Upper sidewall molding portion
12a Upper sidewall design surface
2 Tire
20 Tread molding portion
20a Tread design surface
20c Tread design surface
21 Segment
21a Tapered surface
22 Holder
22a Hole
23 Design surface-divided mold section
24 Protrusion
25 Guide rail
26 Spring member for sliding
28 Engagement groove
28a Inner side
28b Outer side
2a Sidewall
2b Sidewall
2c Tread
2d Tread pattern
3 Lower container
30 External force application mechanism
31 Spring member for pivotal movement
32 Shaft body
33 Flange portion
4 Upper container
40 Second link
41 Long hole
42 Projection
5 Pivot shaft
50 First link
51 Long hole
52 Projection
6 Base member
60 Link support
61 Support axis
64 Support axis
65 Support axis
7 Outer ring
70 Rail
71 Flat part
72 Convex part
7a First inclined surface
7b Second inclined surface
8 Bladder
O Center axis

The invention claimed is:

1. A mold for forming a tire comprising:
 a circular tread molding portion divided into a plurality of circumferentially aligned segments; and
  a tilting mechanism that tilts the segments radially outward when the tread molding portion is opened radially outward, and
  the tilting mechanism reverts the tilt of the segments after the tread molding portion is opened and before the tread molding portion is completely separated from a tire tread.

2. The mold for forming a tire according to claim 1, wherein the tilting mechanism includes,
 a pivot shaft that is provided at one end side, in a direction of center axis of the tread molding portion, of the segment, and is perpendicular to each of a direction of movement of the segment and the center axis of the tread molding portion, a base member that pivotally supports the segment about the pivot shaft, a first tilting mechanism that pivotally moves the segment about the pivot shaft as a center of pivotal movement to tilt the segment when the tread molding portion is opened, and a second tilting mechanism that pivotally moves the segment about the pivot shaft as a center of pivotal movement to revert the tilt of the segment after the tread molding portion is opened.

3. The mold for forming a tire according to claim 2, further comprising an outer ring disposed radially outer side of the segment, and is movable between a holding position that holds the segment in a defined position and a release position that allows the segment to tilt radially outward.

4. The mold for forming a tire according to claim 3, wherein the outer ring has a first inclined surface that biases the segment radially inward when the tread molding portion is being closed, and the outer ring closes the tread molding portion by moving along the direction of the center axis of the segment.

5. The mold for forming a tire according to claim 4, wherein the outer ring has a rail that engages with an engagement groove formed on the segment and draws the segment radially outward when the tread molding portion is opened, the engagement groove and the rail are disposed along an inclination direction of the first inclined surface, the rail has a convex part and a flat part formed at one end portion, the rail biases, as the first tilting mechanism, the segment radially outward by the convex part to pivotally move the segment, and the rail biases, as the second tilting mechanism, the segment radially outward by bringing the engagement groove to being along the flat part of the segment to pivotally move the segment, so as to revert the tilt of the segment.

6. The mold for forming a tire according to claim 5, wherein a first one of the segments is tilted and then a second one of the segments is tilted when the tread molding portion is opened.

7. The mold for forming a tire according to claim 4, wherein the outer ring has a second inclined surface that engages the segment and tows the segment radially inward when the tread molding portion is opened, the second inclined surface is disposed along the first inclined surface, the tilting mechanism has:

a first link, as the first tilting mechanism, connected to one end portion of the segment and engaged to the second inclined surface; and a second link, as the second tilting mechanism, connected to the other end portion of the segment than the side to which the first link is connected and engaged to the second inclined surface, the first link is towed by the second inclined surface and tows the segment radially outward to tilt the segment, and the second link is towed by the second inclined surface and tows the segment radially outward to revert the tilt of the segment.

8. The mold for forming a tire according to claim 7, wherein the first link is released from its engagement to the second inclined surface after the segment has been tilted.

9. The mold for forming a tire according to claim 7, wherein a first one of the segments is tilted and then a second one of the segments is tilted when the tread molding portion is opened.

10. The mold for forming a tire according to claim 2, wherein a first one of the segments is tilted and then a second one of the segments is tilted when the tread molding portion is opened.

11. The mold for forming a tire according to claim 1, wherein a first one of the segments is tilted and then a second one of the segments is tilted when the tread molding portion is opened.

* * * * *